Oct. 9, 1928.
W. C. STEVENS
1,687,466
DEVICE FOR TRIMMING RUBBER STRIPS
Filed July 28, 1925  2 Sheets-Sheet 1
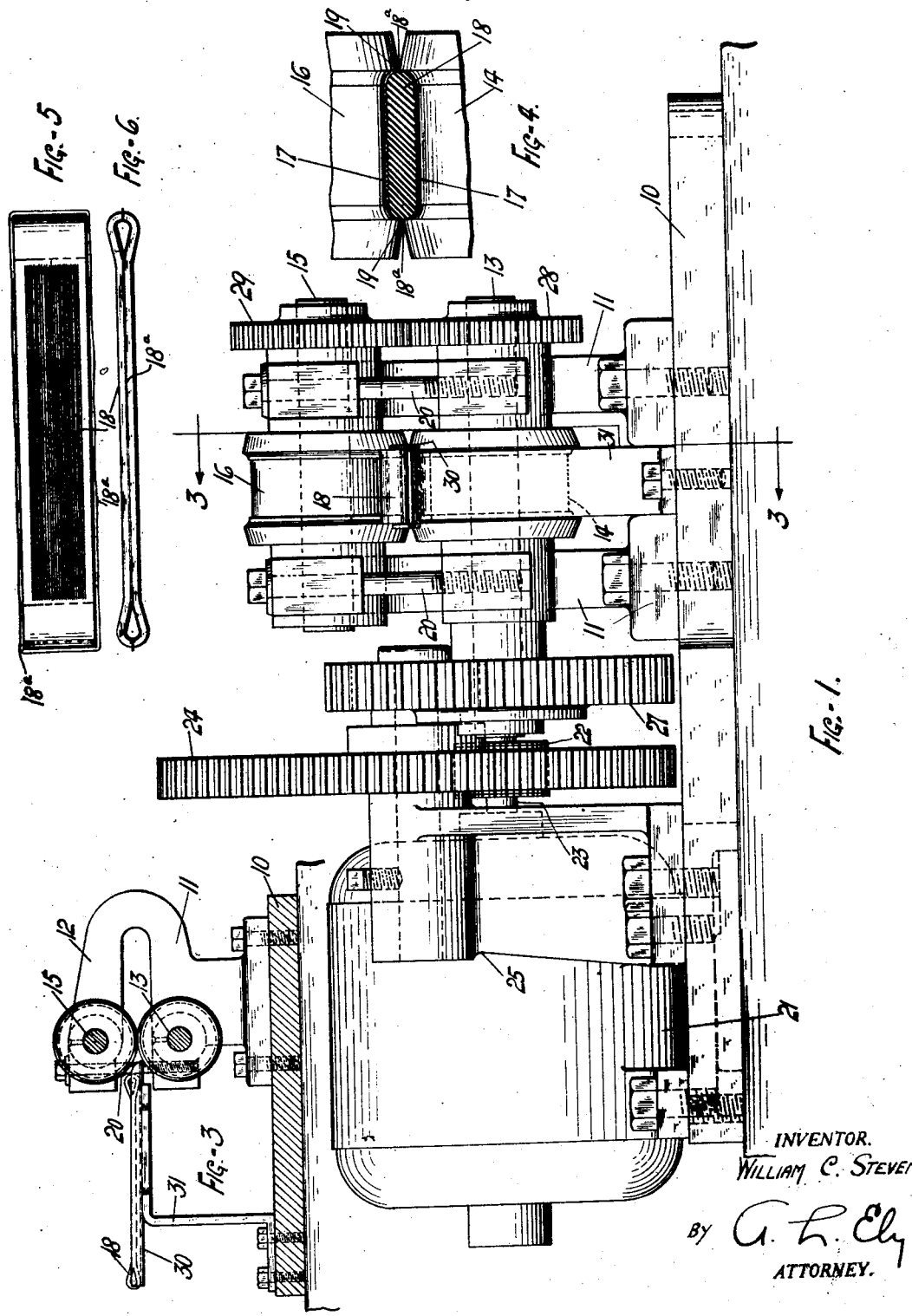
INVENTOR.
WILLIAM C. STEVENS.
BY
ATTORNEY.

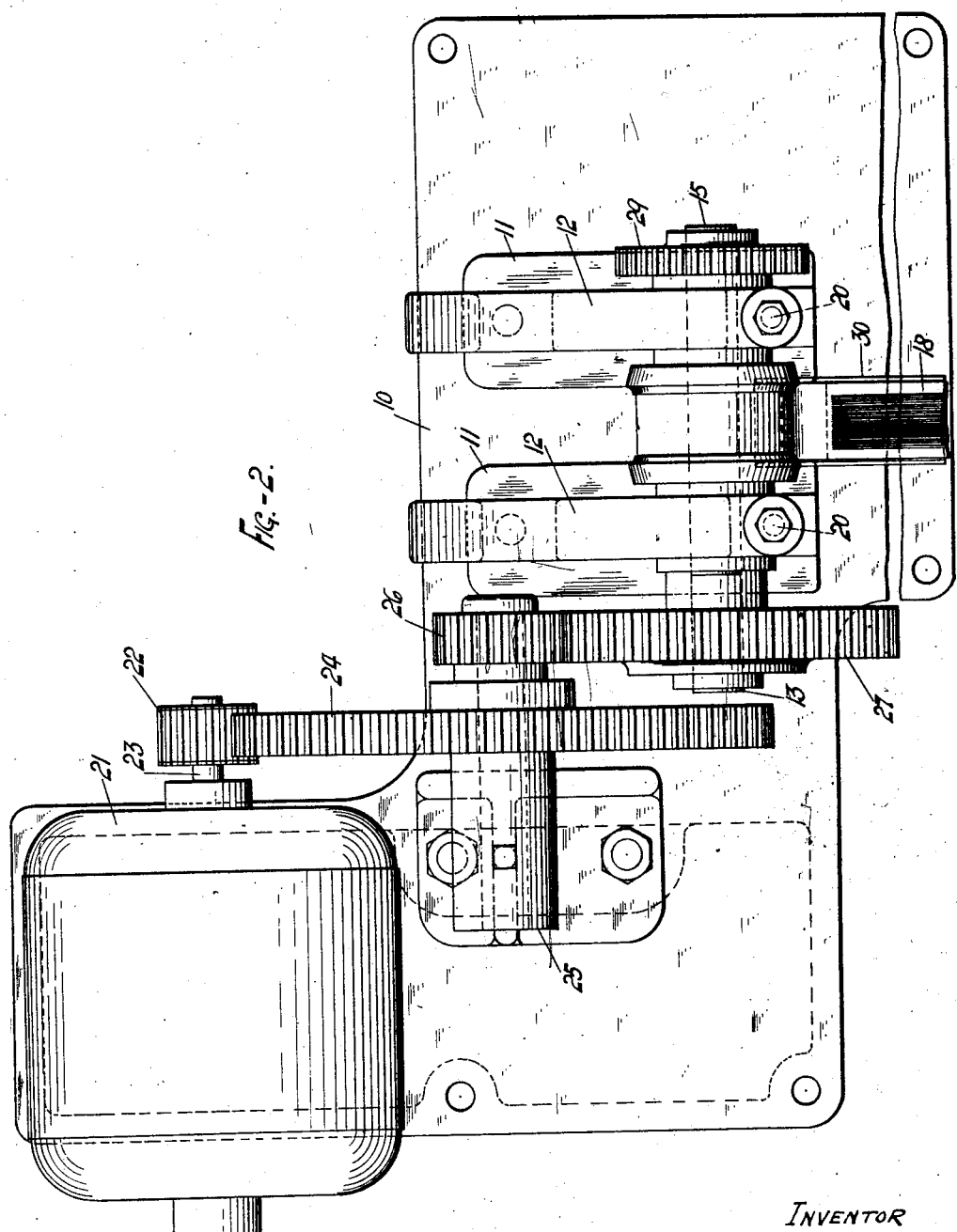

Patented Oct. 9, 1928.

1,687,466

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

DEVICE FOR TRIMMING RUBBER STRIPS.

Application filed July 28, 1925. Serial No. 46,599.

This invention relates to rotary cutters, and particularly to cutters for use on rubber articles in which cooperating rotary cutter knives are employed.

The chief object of the invention is to provide a simple, inexpensive, but highly effective cutter capable of use for trimming the flash or fins formed on molded rubber articles.

A particular object of the invention is to provide a pair of cutter rollers and mountings therefor, whereby they are arranged to be urged together in such a manner as to "pinch" the rubber to be cut therebetween to effect the cutting operation, the pinching action not necessarily being sufficient to complete the severance, but to permit subsequent easy separation of the trimmings from the articles, as by a subsequent tumbling of the articles together in a revolving barrel.

A further object is to provide a cooperating pair of cutter rollers arranged simultaneously to trim opposite edges of strips of rubber, such as rubber door check straps used on automobiles.

The foregoing and other objects are obtained by the construction illustrated in the accompanying drawings and described briefly below. It is to be understood that the invention is not limited to the particular construction shown and described.

Of the accompanying drawings,

Figure 1 is a front elevation of a device embodying the invention;

Figure 2 is a plan thereof;

Figure 3 is a reduced section on line 3—3;

Figure 4 is an enlarged detail showing the cooperating cutter rolls; and

Figure 5 is a plan and Figure 6 is a side elevation of a rubber door check strap before trimmed in the device illustrated.

In the drawings, 10 represents a base plate having thereon a pair of spaced brackets 11, 11, each formed of the shape best shown in Figure 3 so as to provide an integral overhanging slightly yieldable arm 12. Journaled on the body portions of brackets 11 is a shaft 13 having fixed thereon between said brackets a cutter roller 14, and journaled on arms 12 over shaft 13 and in vertical alignment therewith is a shaft 15 having fixed thereon a cutter roller 16 arranged to cooperate with roller 14.

Rollers 14 and 16 are each formed with a groove, as shown at 17, so that in cooperation the rollers will receive the strip of material indicated at 18 therebetween and will be adapted frictionally to drive the same therethrough in proper relation to the cooperating cutting edges 19, 19.

In order to provide for urging the rollers 16 and 14 together with comparatively great pressure so as, in effect, to pinch the rubber apart, cap screws 20, 20 are arranged to extend through the free ends of arms 12 and are threaded into the body portions of brackets 11 whereby, due to the springy or yielding nature of arms 12, roller 16 may be urged against roller 14 with the desired degree of pressure and will be automatically locked in its adjusted position by said action of said arms 12 on cap screws 20.

Any suitable means for driving the rollers 14 and 16 may be employed. There is here shown a motor 21 mounted on base 10 and having a pinion 22 on the rotor shaft 23. Pinion 22 is meshed with a gear 24 journaled on a bracket 25 and rotatably connected to pinion 26 meshed with a gear 27 secured on shaft 13. Shaft 13 has a gear 28 thereon meshed with a gear 29 on shaft 15. Accordingly rollers 14 and 16 will be driven at the same speed in opposite directions.

To facilitate feeding of the strips, such as door check straps, indicated at 18 between the rollers 14 and 16, a suitable guide 30 is so mounted on a bracket 31, which is supported on base 10, as to be directed toward the nip of rollers 14 and 16.

In use for trimming door check straps, the same, having the "flash" portions $18^a$, $18^a$ thereon, are passed between the rollers 14 and 16 as illustrated best in Figures 3 and 4. The edges 19 of the rollers pinch the flashes $18^a$ with great pressure along the edges of the straps 18. The straps are then tumbled as explained and the flashes $18^a$ are easily rubbed off by the tumbling action.

Modifications of the invention may be resorted to without departing from the spirit thereof or the scope of the appended claims.

What is claimed is:

1. Apparatus of the class described, comprising a pair of spaced brackets each formed with an inherently slightly yieldable overhanging arm, a pair of rotatable knives journaled on said brackets, one knife being journaled on said overhanging arms, and capscrews extending through said arms and threaded into said brackets for urging said knife against the other knife.

2. Apparatus for trimming the opposite edges of strips of material, comprising a pair of peripherally grooved, rotatable rollers adapted to cooperate to define a groove of a section somewhat smaller than that of the strips so as to grip the strips to feed them between the rollers, each said roller having cutting edges formed thereon on each edge of its groove, and means for driving said rollers in opposite directions.

3. Apparatus for trimming the opposite edges of strips of material, comprising a pair of peripherally grooved, rotatable rollers adapted to cooperate to define a groove of a section somewhat smaller than that of the strips so as to grip the strips to feed them between the rollers, each said rollers having cutting edges formed thereon on each edge of its groove, one of said rollers being carried on a slightly yieldable mounting, means for urging said roller against the other against the yielding action of said mounting, and means for driving said rollers in opposite directions.

WILLIAM C. STEVENS.